Dec. 6, 1966   J. MULLER   3,289,839
FILTERING EQUIPMENT FOR FLUIDS
Filed Sept. 26, 1963
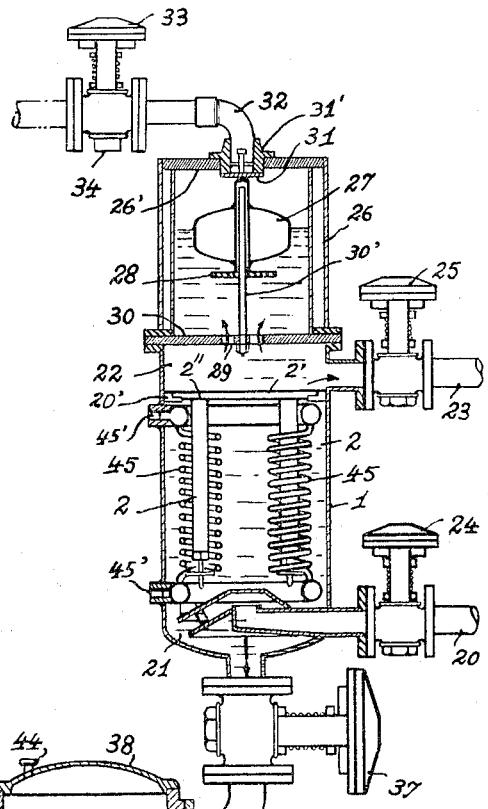
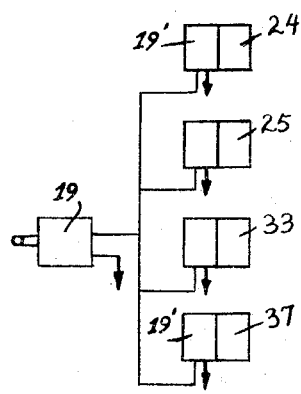
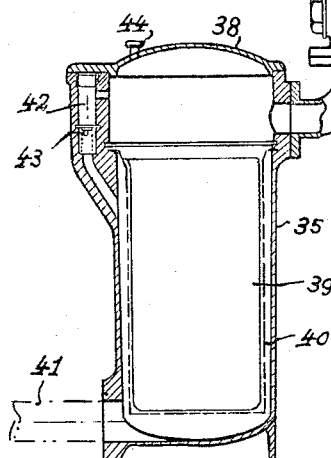
INVENTOR
JACQUES MULLER
BY Dean, Fan Dank & Hirsch
ATTORNEYS

United States Patent Office 3,289,839
Patented Dec. 6, 1966

3,289,839
FILTERING EQUIPMENT FOR FLUIDS
Jacques Muller, 123 Ave. du General de Gaulle,
La Garenne-Colombes, France
Filed Sept. 26, 1963, Ser. No. 311,761
1 Claim. (Cl. 210—126)

This invention relates to the art of filtering equipment, more particularly of the type having self-contained cleaning means for the filters incorporated therein.

As conducive to an understanding of the invention it is noted that where fluid filters or separators are used of the type, for example, shown in co-pending application Serial No. 287,346, filed June 12, 1963, now Patent No. 3,214,368, in which the filter device consists of a stack of grooved discs or washers through which the fluid is passed; where the sediment or particles in the fluid (hereinafter generally referred to as particles) during use of the filter, clogs the grooves or passageways of the stack of washers so that no further fluid can pass therethrough, if the equipment must thereupon be disassembled and the filters removed for cleaning, such procedure is extremely time-consuming and reduces the efficiency of the equipment.

It is accordingly among the objects of the invention to provide a filtering or separating equipment with self-contained cleaning means, whereby when the filters incorporated in the unit become clogged, they may rapidly and automatically be cleaned without disassembly of the device so that the filter or separator may go back into its normal operation in a relatively short period of time thereby increasing the efficiency of the equipment and avoiding the need for skilled mechanics to disassemble and clean the unit.

According to the invention, these objects are accomplished by the arrangement and combination of elements hereinafter described and more particularly recited in the claims.

In the accompanying drawings in which are shown one or more of various possible embodiments of the several features of the invention:

FIG. 1 is a longitudinal sectional view of a separator for removing sediment from liquid fluids and, FIG. 2 is a diaglammatic view of the valve control system of FIG. 1.

The filter equipment shown in FIG. 1 is designed to separate impurities from liquid fluids of all densities.

The filter shown in FIG. 1 comprises a housing 1 in which is supported a stack of filtering washers; illustratively discs having relatively small cross section grooves in the surface thereof with increasing section from the outside to the inside. It is of course understood that other types of fiter elements could be used, but in the illustrative embodiment of the invention herein shown, a filter of the type shown in said application Serial No. 287,346 is utilized.

As illustratively shown, the filter element comprises a plurality of stacks 2 of such washers, each forming a column arranged so as to depend vertically from a supporting plate 2' extending transversely across the housing and seated on an annular support 20' secured to the inner surface of housing 1, the fluid passing from the outer surface of each of said columns 2 through the grooves in each of said superimposed washers, which restricts or restrains passage of particles and then passes upwardly through the bore 2" of each of said columns through an associated opening in the top plate 2'. into a chamber 22 in said housing 1 above plate 2'.

An inlet pipe 20 for the unfiltered fluid leads into the lower end of the housing 1 and an outlet pipe 23 leads into chamber 22, valves 24 and 25 controlling said pipes 20, 23 respectively.

The upper end of housing 1 has a cover plate 30 on which is mounted a tank 26. Secured to and extending vertically upward from the cover plate 30 is a guide rod 30' which slidably mounts a float 27. Secured to the bottom of the float 27 is a valve plate 28 designed to close ports 29 in the cover plate 30 adjacent the rod 30'. The upper end of the float 27 carries a valve plate 31 which is designed to close a nipple 31' extending through the top wall 26' of the tank 26. Connected to the nipple 31' is a pipe 32 which is controlled by a three-way valve 33 which can be connected to a source of compressed air or to atmospheric pressure as at 34.

The lower end of the housing 1 is funnel-shaped as at 21 and said funnel-shaped lower end has an outlet to which a pipe 36 is connected controlled by valve 37.

The pipe 36 is connected to the upper end of a settling tank or container 35 which has a closure cover 38. Positioned in tank 35 is a filtering bag or receptacle 39 encompassed by a perforated container or envelope 40 also positioned in tank 35. An outlet or drain pipe 41 is connected to the bottom end of the settling tank 35.

The settling tank has a safety valve including a spring-urged valve member 43 connected by passageway 42 to the interior of the tank 35 and designed to permit flow from the upper portion of tank 35 into the space between the inner surface of tank 35 and receptacle 39 when the pressure in the receptacle exceeds a predetermined amount. In addition, the cover 38 has an air bleed tap 44 associated therewith.

If desired, the filtering elements 2 may be surrounded by heating coils 45, illustratively of the steam type, having an inlet and an outlet port 45' for the passage of steam therethrough. If desired, instead of a steam type heater, an electric heater may be employed.

In normal operation of the equipment shown in FIG. 1, the valves 37 and 33 are shut off. The unfiltered liquid is forced under pressure through pipe 20 and open valve 24 to enter the housing 1 and then passes through the filtering columns 2 to be discharged upwardly through the bore 2" of each of the columns into the chamber 22 and thence the cleaned liquid is discharged through open valve 25 and pipe 23.

A certain amount of filtered liquid will also pass through the ports 29 into the tank 26 and as the float 27 rises in tank 26, the valve 31 will close the outlet defined by the nipple 31'. When the filtering elements defining the columns 2 become clogged with sediment or particles, the pressure in housing 1 will increase; when such pressure exceeds a predetermined amount, a suitable pressure responsive device 19 (FIG. 2) connected to the housing 1 will automatically be actuated or a pressure responsive alarm (not shown), may be actuated.

If an audible alarm is provided, the operator will then manually close valves 24 and 25 and open valves 33 and 37. If an automatic device 19 is provided, when the latter is actuated it will complete an electric circuit to solenoids 19' controlling valves 24, 25, 33 and 37 to close valves 24 and 25 and to open valves 33 and 37.

As the result of the opening of valve 33, compressed air will enter the pipe 32 and react against the valve 31 to cause the latter to move downwardly and hence such compressed air would then enter the tank 26 to react against the fluid in such tank.

As a result of the pressure exerted against the fluid in tank 26, fluid will be forced through the ports 29 in plate 30 and hence through the bores 2" of the filtering columns 2 to pass through the grooves in the washers defining such columns, thereby dislodging the particles which have blocked such grooves.

Consequently, such particles will fall to the bottom of the housing 1 into the funnel-shaped portion 21 thereof and thence be discharged, by reason of the pressure applied to the fluid, through the open valve 37 in pipe 26 into the settling tank 35.

By reason of the porous filtering bag 39 in tank 35, the liquid fluid therein will be discharged through pipe 41, but the particles will be entrapped in such bag 39.

As the compressed air reacts against the body of liquid in tank 26, the level of such liquid will drop and hence the float 27 will also be lowered until the valve plate 28 seats on cover plate 30 to close the ports 29 to stop further flow of fluid under pressure through such ports.

The valve 33 is then actuated to shut off the air under pressure, but to connect line 32 to atmosphere. As a result, the entrapped air under pressure in the upper portion of tank 26 will be discharged through open nipple 31' and the port 34 of valve 33.

Thereupon, valve 37 is then shut off and valves 24 and 25 are opened so that the equipment can function in normal manner.

As the cleaning cycle above described is relatively short, it does not materially interrupt the filtering action of the equipment.

With successive cleaning or back flushing actions, the settling tank 35, in which filtration by gravity occurs through the bag 39, will gradually fill up with particles while the liquid in the bag will flow through pipe 41 to a sump, for example.

It is apparent with the construction above described, effective cleaning of the filter units may be accomplished in a relatively short period of time without need for disassembly of the equipment, so that normal filtering action can be resumed almost immediately after clogging occurs with resultant high efficiency of the equipment.

As many changes could be made in the above construction, and many apparently widely different embodiments of this invention could be made without departing from the scope of the claim, it is intended that all matter contained in the above description or shown in the accompanying drawings shall be interpreted as illustrative and not in a limiting sense.

Having thus described my invention, what I claim as new and desire to secure by Letters Patent of the United States is:

Equipment for filtering particles from fluids, comprising a container having an inlet adjacent its lower end for unfiltered fluids, and an outlet at its lower end, a chamber positioned above the container to receive filtered fluid, a second chamber positioned above said first chamber, a passageway provided between said two chambers, said first chamber having an outlet, a first pair of valves controlling said container inlet and first chamber outlet respectively, a filter column in said container having a central bore in communication at its upper end with said first chamber, said filter column permitting flow of fluid therethrough from the outer surface thereof into said bore but restraining passage of such particles, a valve controlling said container outlet, a particle collecting chamber beneath said container and in communication therewith through said container outlet, and valve controlled means to apply gas under pressure to react against the contents of said first and second chamber, said valve controlled means comprising a port leading into the upper end of said second chamber, a gas pressure line connected to said port and a valve controlling said line, a float slidably mounted for vertical movement in said second chamber, a pair of valves carried by said float on the bottom and top thereof respectively, said valves respectively closing the passageway between said first and second chambers when the float is in its lowermost position and closing the port leading into the upper end of said second chamber when the float is in its uppermost position, whereby in normal operation of said equipment with said first pair of valves in open position and said container outlet valve and said valve controlled means in closed position, fluid forced under pressure into said container will be filtered by said filter column and the filtered fluid will be discharged through said first chamber outlet and with said first pair of valves in closed position and said container outlet valve and said valve controlled means in open position, the gas under pressure reacting against the contents of said first and second chamber will force the fluid in said first chamber in reverse direction through said filter column to dislodge the particles clogging the outer surface thereof for discharge through said open container outlet valve into said collecting chamber.

References Cited by the Examiner

UNITED STATES PATENTS

| | | | |
|---|---|---|---|
| 478,539 | 7/1892 | Goodhue | 100—116 |
| 548,487 | 9/1895 | Way | 210—411 X |
| 1,071,020 | 8/1913 | Bartholomew | 100—116 |
| 1,602,626 | 10/1926 | Power | 100—112 |
| 1,750,073 | 3/1930 | Walsh | 210—184 X |
| 2,073,847 | 3/1937 | Miller | 210—184 X |
| 2,434,427 | 1/1948 | Muller | 210—306 X |
| 2,772,786 | 12/1956 | Gardes | 210—108 X |
| 2,909,285 | 10/1959 | Besler | 210—346 X |
| 2,982,412 | 5/1961 | Hirs | 210—108 |
| 2,985,308 | 5/1961 | Koupal | 210—411 X |
| 3,055,290 | 9/1962 | Arvanitakis | 210—262 X |

FOREIGN PATENTS

| | | |
|---|---|---|
| Ad. 26,409 | 7/1923 | France. |
| Ad. 51,072 | 4/1941 | France. |
| 1,141,129 | 3/1957 | France. |

REUBEN FRIEDMAN, *Primary Examiner.*

SAMIH N. ZAHARNA, *Examiner.*